United States Patent
Quadri

(10) Patent No.: US 8,944,646 B2
(45) Date of Patent: Feb. 3, 2015

(54) EFFECTS WHEEL ASSEMBLY FOR A LIGHT FIXTURE, IN PARTICULAR A STAGE LIGHT FIXTURE

(75) Inventor: Pasquale Quadri, Torre de' Roveri (IT)

(73) Assignee: Clay Paky S.p.A., Seriate (IT)

(*) Notice: Subject to any disclaimer, the term of this patent is extended or adjusted under 35 U.S.C. 154(b) by 1093 days.

(21) Appl. No.: 12/989,245

(22) PCT Filed: Apr. 22, 2009

(86) PCT No.: PCT/IB2009/005324
§ 371 (c)(1),
(2), (4) Date: Jan. 5, 2011

(87) PCT Pub. No.: WO2009/130574
PCT Pub. Date: Oct. 29, 2009

(65) Prior Publication Data
US 2011/0110103 A1   May 12, 2011

(30) Foreign Application Priority Data
Apr. 23, 2008   (IT) .............................. MI2008A0741

(51) Int. Cl.
*F21V 17/02* (2006.01)
*F21S 10/00* (2006.01)
(Continued)

(52) U.S. Cl.
CPC ............. *F21S 10/007* (2013.01); *G02B 26/008* (2013.01); *F21W 2131/406* (2013.01); *G02B 7/006* (2013.01)
USPC ........... 362/323; 362/281; 362/319; 362/351; 362/355; 362/293; 362/311.01; 362/277; 359/893

(58) Field of Classification Search
CPC .. F21W 2131/406; F21V 17/02; F21V 17/04; F21V 17/06; F21V 14/08; F21V 9/08; F21V 9/10; F21V 9/16; F21V 11/08; F21V 11/10; F21V 11/12; F21V 11/14; F21S 10/02; F21S 48/145; B60Q 1/1438
USPC ......... 362/281, 322, 323, 319, 351, 355, 269, 362/293, 311.01, 277; 359/831, 893
See application file for complete search history.

(56) References Cited

U.S. PATENT DOCUMENTS 5,198,939 A * 3/1993 Hewett ........................... 359/889
5,515,119 A * 5/1996 Murdock et al. ............... 352/131
(Continued)

FOREIGN PATENT DOCUMENTS

EP   0674202   9/1995
EP   1462713   9/2004

OTHER PUBLICATIONS

International Search Report and Written Opinion from International Application No. PCT/IB2009/005324.

*Primary Examiner* — Mary McManmon
(74) *Attorney, Agent, or Firm* — Dorsey & Whitney LLP

(57) ABSTRACT

An effects wheel assembly for a light fixture, in particular a stage light fixture, suitable to generate a light beam, has a supporting device which rotates about a first axis; and an effects wheel having a hub, which extends about a second axis, and an effects portion, which extends about the hub and is suitable to generate optical effects when intercepting the light beam; the supporting device and the effects wheel being selectively connectable to each other by means of jaws elastically operated to clamp the effects wheel when the hub is inserted between the jaws.

11 Claims, 4 Drawing Sheets

(51) Int. Cl.
*G02B 26/00* (2006.01)
*F21W 131/406* (2006.01)
*G02B 7/00* (2006.01)

(56) References Cited

U.S. PATENT DOCUMENTS

| | | | |
|---|---|---|---|
| 5,562,007 A * | 10/1996 | Seymour | 82/1.11 |
| 5,934,794 A * | 8/1999 | Hutton | 362/283 |
| 5,988,835 A * | 11/1999 | Allen | 362/324 |
| 6,048,080 A * | 4/2000 | Belliveau | 362/282 |
| 6,078,443 A * | 6/2000 | Yu | 359/892 |
| 6,113,252 A * | 9/2000 | Arlitt et al. | 362/365 |
| 6,220,730 B1 * | 4/2001 | Hewlett et al. | 362/297 |
| 6,270,239 B1 * | 8/2001 | Sund | 362/295 |
| 6,357,893 B1 * | 3/2002 | Belliveau | 362/285 |
| 6,601,973 B2 * | 8/2003 | Rasmussen et al. | 362/282 |
| 6,971,770 B2 | 12/2005 | Rasmussen et al. | |
| 7,147,350 B1 * | 12/2006 | Schofield | 362/324 |
| 7,222,997 B2 | 5/2007 | Rasmussen et al. | |
| RE40,415 E * | 7/2008 | Tahara et al. | 375/240.23 |
| 7,736,022 B2 * | 6/2010 | Jurik | 362/283 |
| 2003/0137844 A1 * | 7/2003 | Bucher et al. | 362/293 |
| 2004/0125602 A1 * | 7/2004 | Hunt et al. | 362/293 |
| 2007/0229996 A1 * | 10/2007 | Tsou et al. | 359/892 |

* cited by examiner

EFFECTS WHEEL ASSEMBLY FOR A LIGHT FIXTURE, IN PARTICULAR A STAGE LIGHT FIXTURE

CROSS-REFERENCE TO RELATED APPLICATIONS

This application is a U.S. Nationalization of PCT International Application No. PCT/IB2009/005324 filed 22 Apr. 2009, entitled "EFFECTS WHEEL ASSEMBLY FOR A LIGHT FIXTURE, IN PARTICULAR A STAGE LIGHT FIXTURE," which claims priority to Italian Patent Application No. MI2008A000741 filed 23 Apr. 2008, the entireties of both of the foregoing applications are incorporated herein by reference.

TECHNICAL FIELD

Embodiments of the present invention relate to an effects wheel assembly for a light fixture, in particular a stage light fixture suitable to generate a light beam.

BACKGROUND ART

Specifically, the effects wheel assembly comprises a supporting device which rotates about a first axis; an effects wheel having a hub, which extends about a second axis, and an effects portion, which extends about the hub and is suitable to generate optical effects when intercepting the light beam; the supporting device and the effects wheel being selectively connectable to each other.

The definition "effects wheel" comprises, for the purposes of the present description, both an effects wheel having an effects portion defined by a metal annular plate suitable to accommodate gobos, and an effects wheel having an effects portion defined by a glass disc.

The term "gobo" defines a metal disc, typically made of stainless steel or glass, in which a motif or shape suitable to shape the light beam is obtained. Each gobo is generally coupled, in a releasable manner, in a respective seat of the metal annular plate.

Generally, the effects wheel is connected to the supporting device by a screw. This fastening mode does not allow the effects wheel to be easily coupled with the supporting device and compromises the interchangeability thereof.

In order to avoid this drawback, effects wheel assemblies of the above-described type, which include a magnetic fastening device between the effects wheel and the supporting device, have been developed. The mentioned effects wheel assemblies are, inter alia, disclosed by U.S. Pat. Nos. 6,971,770 B2 and 7,222,997 B2, which is the continuation in part of U.S. Pat. No. 6,971,770 B2.

In accordance with the aforementioned U.S. Pat. No. 6,971,770 B2, the connection between the supporting device and the effects wheel is obtained by means of a washer, which is defined by a permanent magnet, is fixed to the effects wheel, and is fastenable to the supporting device, which is made of ferromagnetic material.

In accordance with the aforesaid U.S. Pat. No. 7,222,997 B2, the connection between the supporting device and the effects wheel is obtained by means of a washer, which is defined by a permanent magnet, is fixed to the supporting device, and is fastenable to the effects wheel, which has a hub made of ferromagnetic material.

U.S. Pat. No. 7,222,997 B2 also includes the solution in which both the supporting device and the effects wheel comprise respective washers consisting of permanent magnets.

The clamping by means of magnetic force is not sufficient to ensure the correct alignment between the first axis of the supporting device and the second axis of the effects wheel. For this reason, the effects wheel assemblies defined above comprise respective centering means, each of which is defined by a hole and a pin which may be reciprocally coupled and respectively staggered with respect to the first and second axes so as to transmit a torque between the supporting device and the effects wheel.

The effects wheel assemblies identified above have proven to be effective; however, coupling the effects wheel with the supporting device is difficult because the space inside the light fixture is confined and does not allow the operator who couples the effects wheel with the supporting device to see the coupling area. Therefore, centering is made by trial and error in sequence, and also provided that the magnetic force inadvertently attracts the effects wheel when the operator approaches the hub to the effect wheel within a given distance.

SUMMARY

One or more embodiments of the present invention provide an effects wheel assembly for a light fixture which generally facilitates the replacement of the effects wheel.

One or more embodiments of the present invention provide an effects wheel which facilities the step of coupling the effects wheel with the supporting device.

According to an embodiment of the present invention, an effects wheel assembly for a light fixture, in particular for a stage light fixture, is disclosed, which comprises a supporting device which rotates about a first axis; and an effects wheel having a hub that extends about a second axis, and an effects portion that extends about the hub and is suitable to generate optical effects when intercepting the light beam. The supporting device and the effects wheel are selectively connectable to each other. The effects wheel assembly is characterized in that the supporting device comprises first and second jaws elastically operated to releasably clamp the effects wheel when the hub is inserted between the first and second jaws.

One or more embodiments of the present invention further concern a stage light fixture.

In accordance with an embodiment of the present invention, a light fixture, in particular a stage light fixture, suitable to generate a light beam is provided. The light fixture comprises an effects wheel assembly provided with an effects wheel having a hub that extends about a first axis and an effects portion that extends about the hub and is suitable to generate optical effects when intercepting the light beam; and a supporting device, which rotates about a second given axis and is selectively connectable to the effects wheel. The light fixture is characterized in that the supporting device comprises first and second jaws which may be elastically operated to releasably clamp the effects wheel when the hub is inserted between the jaws with the first axis aligned to the second axis.

BRIEF DESCRIPTION OF THE DRAWINGS

Further details, features and advantages of the invention will be more apparent from the description of the following non-limitative embodiments, with reference to the accompanying drawings, in which.

DETAILED DESCRIPTION

Figure 1:
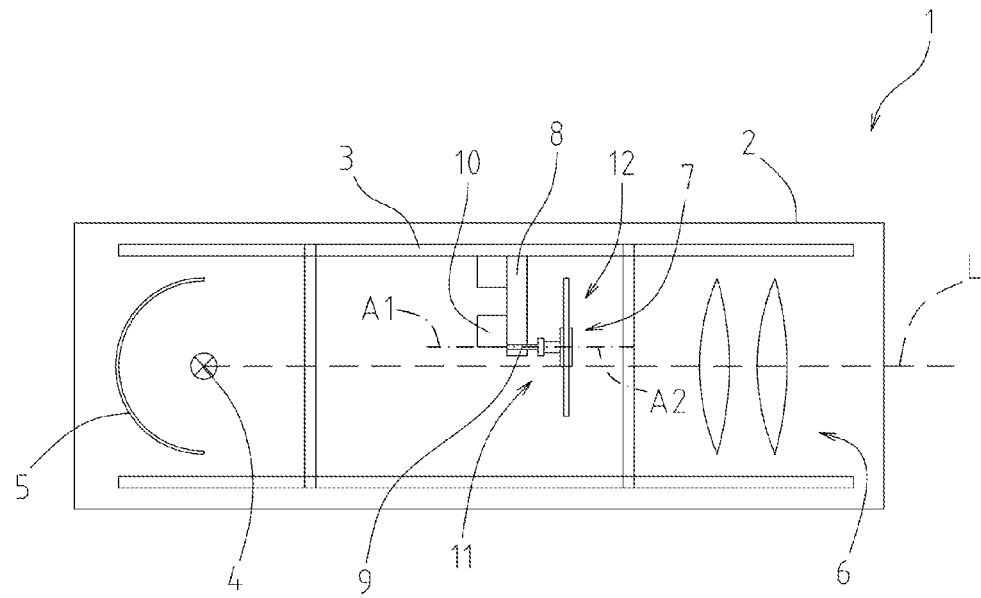
FIG. 1 is a diagrammatic side elevation view, with parts removed for clarity, of a stage light fixture comprising an effects wheel made according to an embodiment of the present invention.

In FIG. 1, numeral 1 indicates as a whole a stage light fixture comprising a casing 2, a frame 3, a light source 4 for originating a light beam L, a spotlight 5 for orienting the light beam L, and a lens assembly 6 for obtaining a zoom effect.

The definition of stage light fixture includes both fixed-head light fixtures and jointed-head light fixtures.

In general, stage light fixture 1 comprises a plurality of components (most of which not shown) arranged between the light source 4 and the lens assembly 6. Such components serve the function of generating optical effects, and these include an effects wheel assembly 7, which is selectively capable of intercepting the light beam L. The other components, including the color disc, the dimmer, the frame, the rotating gobos assembly (not shown in the accompanying drawings) and the other fixtures of known type, also not shown in the accompanying drawings, are arranged inside the casing 3 and considerably reduce the available space inside the light fixture 1. With this regard, it is worth reminding that market needs impose to make small, manageable stage light fixtures with, at the same time, a plurality of components which allow to make a plurality of optical effects. Furthermore, according to a variant not shown in the accompanying drawings, the stage light fixture 1 may comprise more than one effects wheel assembly 7, so as to be able to combine the optical effects of the two effects wheel assemblies 7.

The effects wheel assembly 7 is supported by an arm 8 connected to the frame 3 and a shaft 9, which rotates with respect to the arm 8 and is operated by a motor 10.

The effects wheel assembly 7 comprises a supporting device 11, which is fixed to the shaft 9; and an effects wheel 12, which is selectively fastenable to the supporting device 11.

Figure 2:
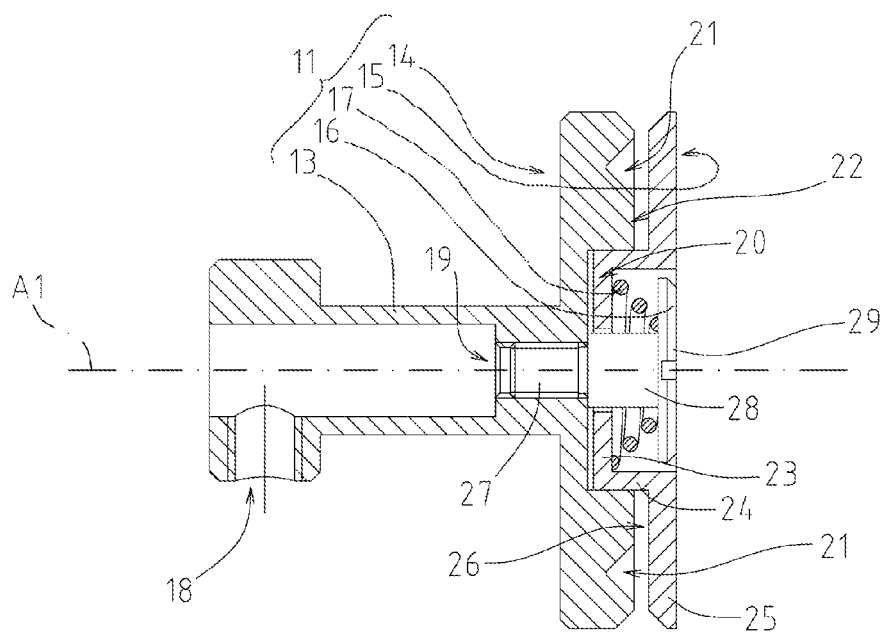
FIG. 2 is a side elevation section view, on enlarged scale and with parts removed for clarity, of a component of the effects wheel assembly in FIG. 1.

With reference to FIG. 2, the supporting device 11 extends about an axis A1 and comprises a sleeve 13 suitable to accommodate the shaft 9 (FIG. 1); a jaw 14 integral with the sleeve; a jaw 15 coupled so as to slide along axis A1; an abutting element 16 fixed to the jaw 14; and a spring 17 suitable to bias jaw 15 towards jaw 14.

The sleeve 13 has two holes 18 and 19: the hole 18 is perpendicular to axis A1 and suitable to accommodate a dowel (not shown in the accompanying drawings) in order to fix sleeve 13 to shaft 9 (FIG. 1), while the hole 19 is coaxial to the sleeve 13 and suitable to fix the abutting element 16.

Figure 5:
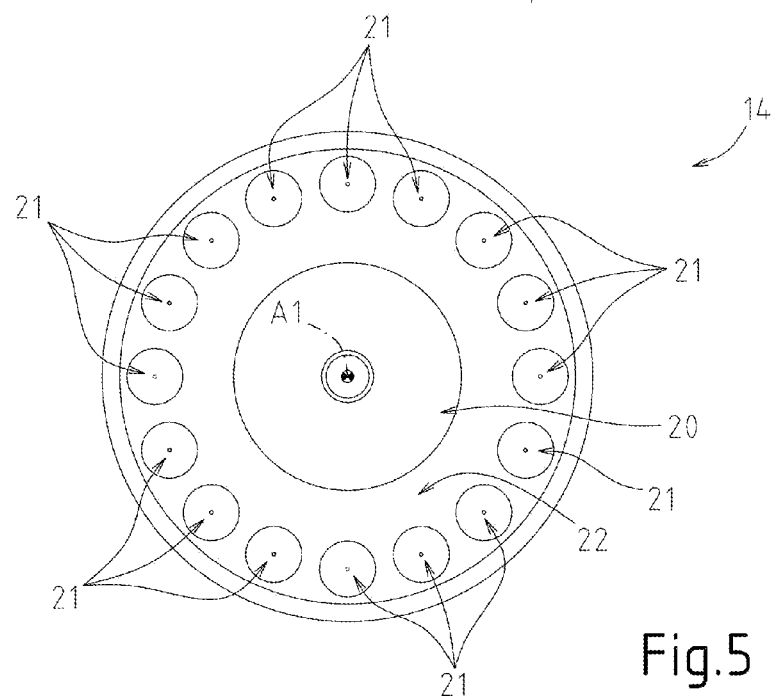
FIG. 5 is a front elevation view, with parts removed for clarity, of a detail of the component in FIG. 2.

The jaw 14 is disc-shaped and integral with the sleeve 13. On the side opposite to the sleeve 13, the jaw 14 has a cylindrical seat 20 with axis A1 and a plurality of cavities 21 distributed along a face 22 of the jaw 14 and along a primitive of axis A1 and about axis A1. In the case illustrated in FIG. 5, the cavities 21 are uniformly distributed about axis A1, are cone-shaped and are sixteen in number. In other words, cavities 21 are spaced out by an angle of 22.5°.

With reference to FIG. 2, the jaw 15 is annular disc-shaped with a recessed central portion. In particular, the jaw 15 comprises a central annular disc 23 joined to a cylinder 24, which is joined to an annular disc 25, which lays on a plane parallel to and staggered from the laying plane of the annular disc 23 and has a face 26 facing the face 22.

The jaw 15 is coupled with the jaw 14 so as to slide along axis A1. In particular, the cylinder 24 is coupled so as to slide along axis A1 in the seat 20, so that the face 26 is held at a given distance from the face 22 when the jaw 15 abuts against the jaw 14.

The faces 22 and 26 are joined by chamfers to the external edge of the respective jaws 14 and 15 to facilitate the insertion of the effects wheel 12.

The abutting element 16 is essentially a screw which has in sequence, from left to right, a threaded shank 27, a spacer 28 coaxial to the threaded shank and a flared head 29. The abutting element 16 is screwed into the treaded hole 19 when jaw 15 and spring 17 are arranged between the jaw 14 and the abutting element 16, in particular the head 29 of the abutting element 16.

Figure 4:
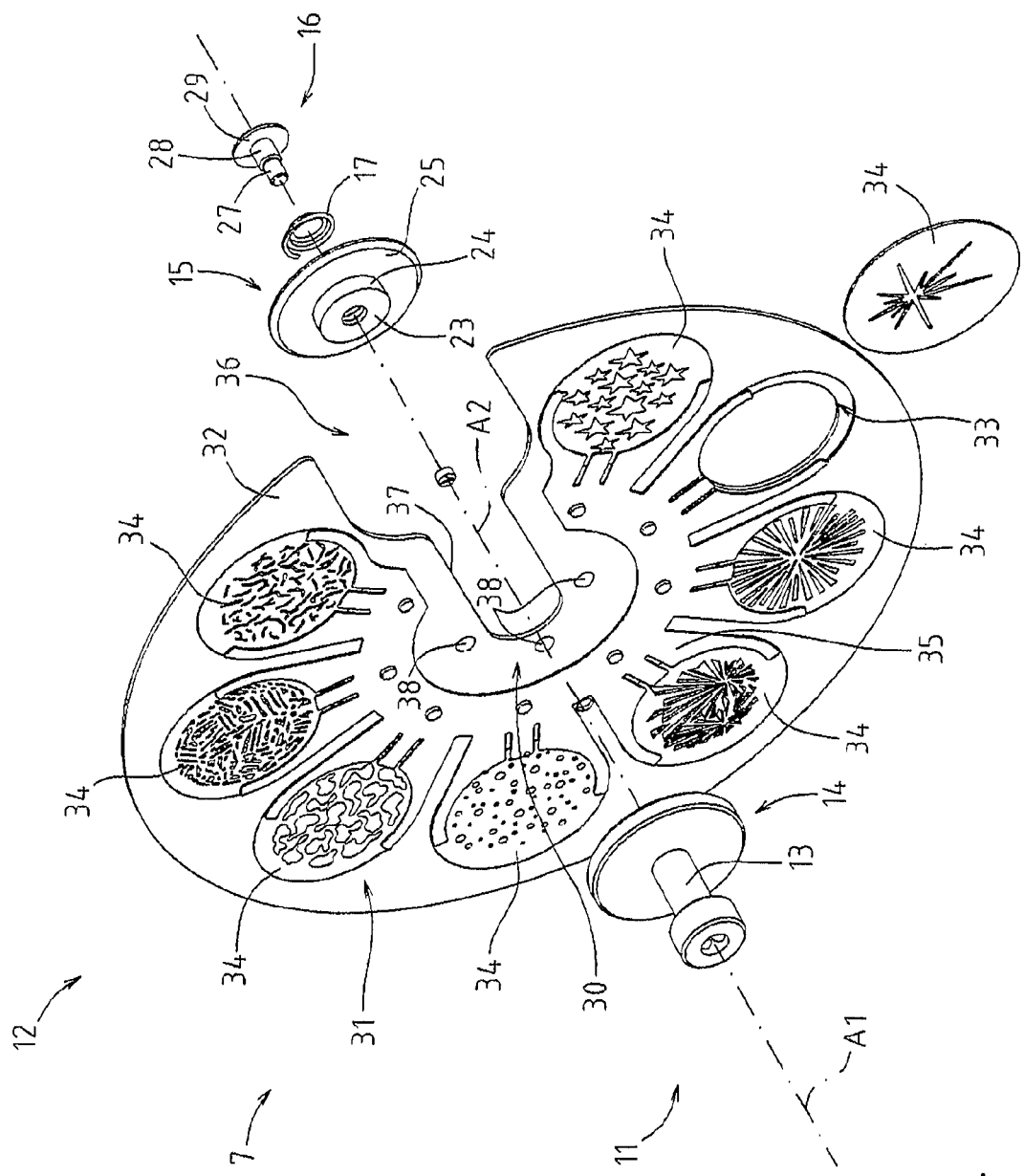
FIG. 4 is an exploded view, on enlarged scale and with parts removed for clarity, of the effects wheel assembly in FIG. 1.

With reference to FIG. 4, the effects wheel 12 comprises a hub 30, which extends about an axis A2 and an effects portion 31, which extends about the hub 30.

In the case in FIG. 4, the effects wheel 12 comprises a metal annular plate 32 having a plurality of seats 33 for accommodating the gobos 34 at the effects area, and a spring 35 for maintaining the gobos 34 in the corresponding seats 33. The plate 32 has a slot 36 which extends through the effects portion 31 and through the hub 30: the slot 36 is particularly wide in the effects portion so as to allow the light beam 1 to pass in that given area (FIG. 1), while it is particularly narrow at the hub 30. In particular, the slot 36 is delimited by an edge 37, which in the area of the hub 30 substantially corresponds to the diameter of the cylinder 24, which defines, as better illustrated in FIG. 3, an abutting and centering element for the effects wheel 12.

Figure 3:
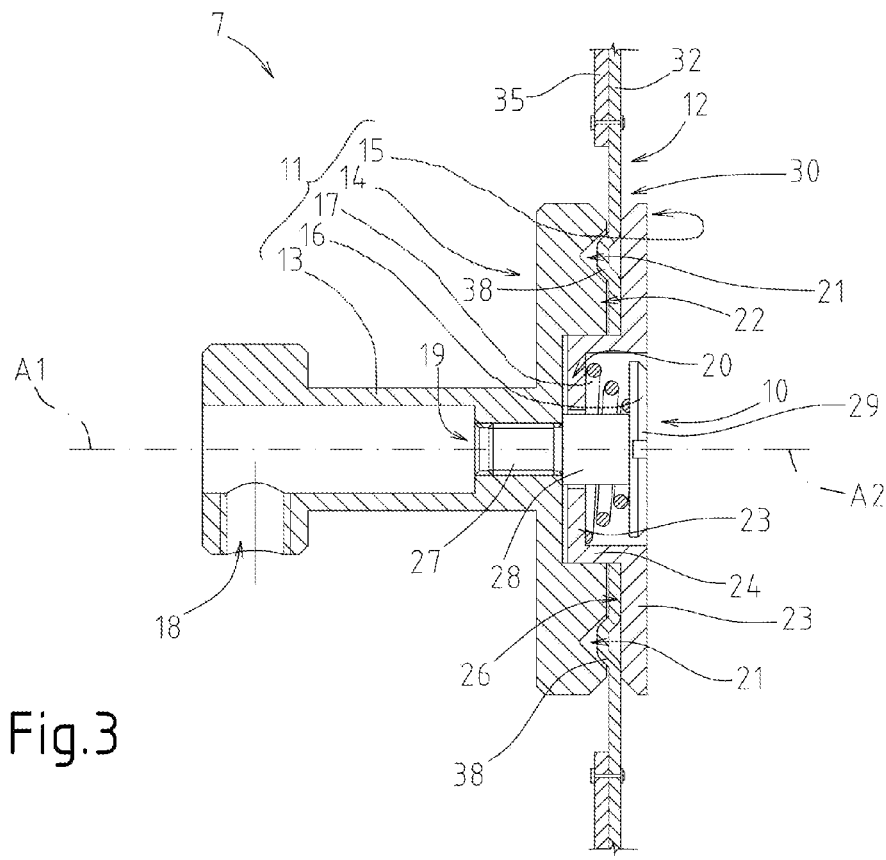
FIG. 3 is a side elevation section view, on enlarged scale and with parts removed for clarity, of the effects wheel assembly in FIG. 1.

With reference to FIG. 4, the effects wheel comprises three protrusions 38 arranged at 90° from one another at the hub 30. Alternatively, a single protrusion 38 or a number of protrusions distributed about axis A1 with a distribution pitch equal to an integer multiple of 22.5° would be sufficient, so that each protrusion 38 may be accommodated in a respective cavity 21, as shown in FIG. 3. The high number of cavities 21 (FIG. 5) avoids the supporting device 11 from being rotated with respect to the effects wheel 12 for achieve the coupling.

With reference to FIG. 3, the effects wheel 12 is arranged between the two jaws and with the axis A2 thereof aligned with the axis A1 of the supporting device 11. Furthermore, the protrusions 38 are engaged in respective cavities 21 and, in the case shown, are substantially bosses made by drawing in the metal annular plate 32 at the hub 30.

Figure 6:
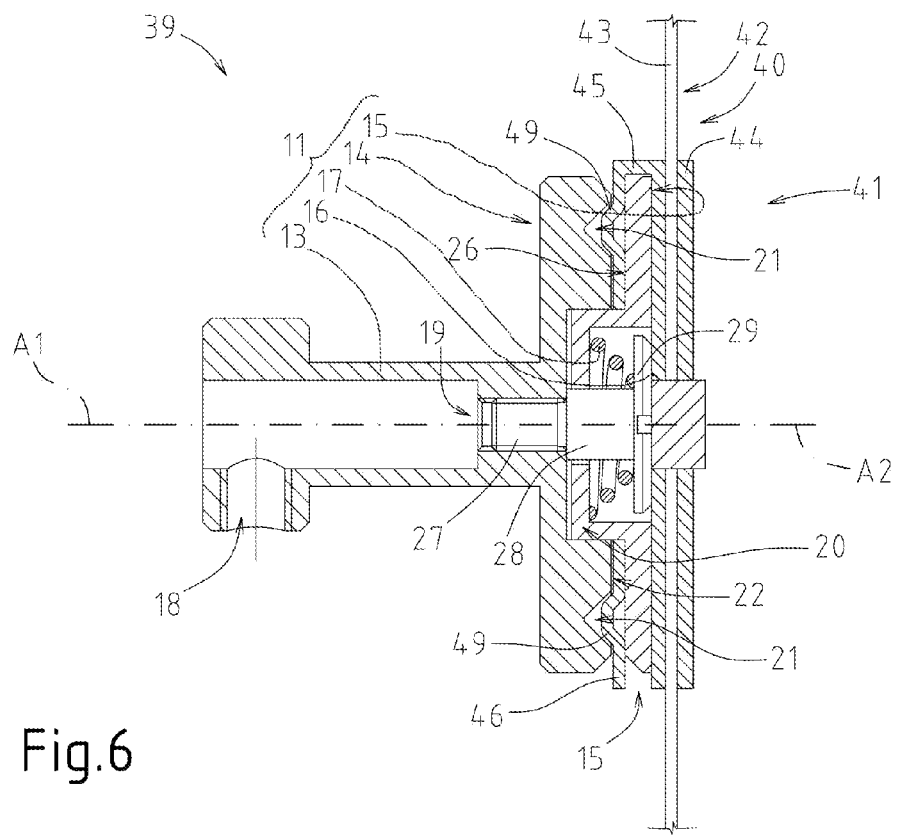
FIG. 6 is a side elevation section view, with parts removed for clarity, of an effects wheel assembly in accordance with a second embodiment of the present invention.
Figure 7:
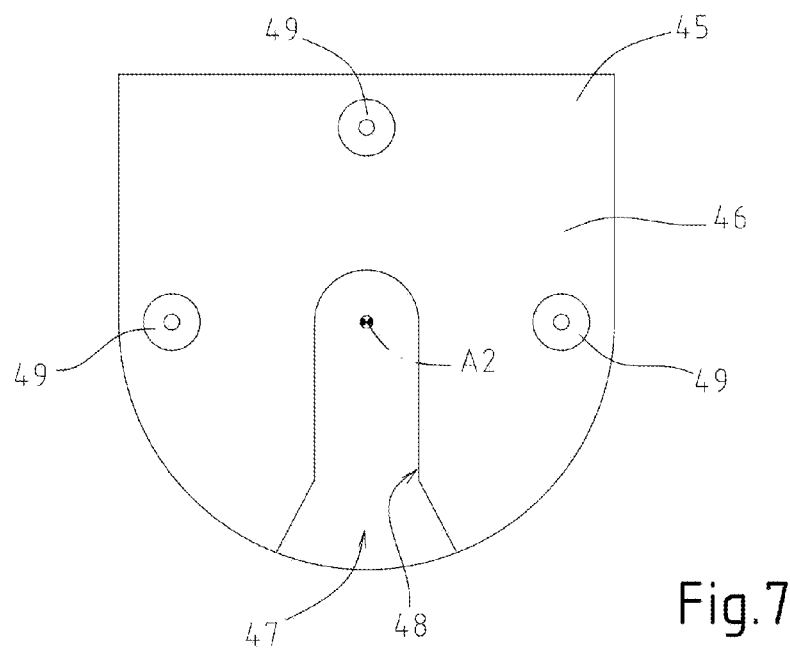
FIG. 7 is a front elevation view, with parts removed for clarity, of a detail of the effects wheel assembly in FIG. 6.

In FIG. 6, numeral 39 identifies an effects wheel assembly which comprises a supporting device 11 identical to that described with reference to the previously described embodiment, and an effects wheel 40, which comprises a hub 41 extending about an axis A2 and an effects portion 42 extending about the hub 41.

In the case in FIG. 6, the effects portion 42 is defined by a glass disc 43 having a varying thickness to deform the light beam L (FIG. 1) clamped between two flanges 44 and 45, which define the hub 41. The flange 45 is U-folded and has a plate 46 along which a slot 47 is obtained being provided with an edge 48 and protrusions 49. In this case, the plate 46 lays on a plane parallel to and staggered from the laying plane of the effects portion 42. The operation of the glass effects wheel 40 does not include the possibility of making a slot along the effects portion 42.

The inserting and releasing modes of the effects wheel 40 are described with reference to the effects wheel 12.

It is finally apparent that changes and variations may be made to the effects wheel assemblies 7 and 39 described herein without departing from the scope of the appended claims.

The invention claimed is:

1. An effects wheel assembly for a light fixture suitable to generate a light beam, the effects wheel assembly comprising: a supporting device which rotates about a first axis; an effects wheel having a hub that extends about a second axis, and an effects portion that extends about the hub and is suitable to generate optical effects when intercepting the light beam;
wherein the supporting device and the effects wheel are selectively connectable to each other; and
wherein the supporting device comprises:
a first jaw and a second jaw, wherein one of the first or second jaws includes a substantially cylindrical annular section, the cylindrical annular section is received into the other of the first or second jaws, and the first and second jaws are arranged and configured to be elastically operated in an axial direction to clamp the effects wheel in a releasable manner when the hub is inserted between the first and second jaws; and
a biasing member arranged and configured to provide a relative axial bias of the first and second jaws toward each other; wherein the hub includes a plate having a radial slot delimited by an edge, the supporting device including an abutting and centering element suitable to be coupled with the hub along the radial slot and arranged in abutment against the edge when the first axis and the second axis are reciprocally aligned; wherein the plate and the effects portion are substantially coplanar, and the radial slot of the plate extends generally along the effects portion.

2. The effects wheel assembly according to claim 1, wherein said plate lays along a substantially parallel plane staggered with respect to the laying plane of the effects portion.

3. The effects wheel assembly according to claim 1, wherein the plate comprises at least a protrusion in a direction substantially parallel to the second axis.

4. The effects wheel assembly according to claim 3, wherein at least one of the first and second jaws comprises a plurality of cavities substantially uniformly distributed about the first axis; each seat being suitable to accommodate said protrusion.

5. The effects wheel assembly according to claim 1, wherein the first and second jaws are coupled so as to slide along the first axis.

6. The effects wheel assembly according to claim 5, wherein the second jaw is arranged between the first jaw and an abutting element is connected to the first jaw; wherein the biasing member includes a spring, the spring being arranged between the abutting element and the second jaw.

7. The effects wheel assembly according to claim 5, wherein the first and second jaws have first and second faces facing each other, respectively.

8. The effects wheel assembly according to claim 7, wherein the first and second faces are reciprocally spaced out in the absence of the effects wheel.

9. A light fixture suitable to generate a light beam, the light fixture comprising: an effects wheel assembly that comprises a supporting device, which rotates about a first axis;
and an effects wheel having a hub that extends about a second axis, and an effects portion that extends about the hub and is suitable to generate optical effects when intercepting the light beam;
wherein the supporting device and the effects wheel are selectively connectable; and wherein the supporting device comprises a first jaw and a second jaw, wherein one of the first or second jaws includes a substantially cylindrical annular section and the first and second jaws are arranged and configured to be elastically operated in an axial direction to clamp the effects wheel in a releasable manner when the hub is inserted between the first and second jaws, the substantially cylindrical annular section is received into, the other of the first or second jaws, so as to guide the second jaw along the first axis, the supporting device including a biasing member arranged and configured to provide a relative axial bias of the first and second jaws together.

10. An effects wheel assembly for a light fixture suitable to generate a light beam, the effects wheel assembly comprising:
a supporting device which rotates about a first axis;
an effects wheel having a hub that extends about a second axis, and an effects portion that extends about the hub and is suitable to generate optical effects when intercepting the light beam;
wherein the supporting device and the effects wheel are selectively connectable to each other;
wherein the supporting device includes a first jaw and a second jaw, one of the first or second jaws includes a substantially cylindrical annular section, the substantially cylindrical annular section is received into the other of the first or second jaws, and the first and second jaws are arranged and configured to be elastically operated in an axial direction to clamp the effects wheel in a releasable manner when the hub is inserted between the first and second jaws, the supporting device including a biasing member arranged and configured to provide a relative axial bias of one jaw toward the other jaw;
wherein the hub includes a plate having a radial slot delimited by an edge, the supporting device including an abutting and centering element suitable to be coupled with the hub along the radial slot and arranged in abutment against said edge when the first axis and the second axis are reciprocally aligned; and
wherein the plate lays along a substantially parallel plane staggered with respect to the laying plane of the effects portion.

11. An effects wheel assembly for a light fixture suitable to generate a light beam, the effects wheel assembly comprising:
a supporting device which rotates about a first axis;
an effects wheel having a hub that extends about a second axis, and an effects portion that extends about the hub and is suitable to generate optical effects when intercepting the light beam;
wherein the supporting device and the effects wheel are selectively connectable to each other;
wherein the supporting device includes
a first jaw and a second jaw, one of the first or second jaws includes a substantially cylindrical annular section, the substantially cylindrical annular section is received into the other of the first or second jaws, and the first and second jaws are arranged and configured to be elastically operated in an axial direction to clamp the effects wheel in a releasable manner when the hub is inserted between the first and second jaws, the supporting device including a biasing member arranged and configured to provide a relative axial bias of one jaw toward the other jaw; and wherein the hub includes a plate having a radial slot delimited by an edge and at least a protrusion in a direction substantially parallel to the second axis, the supporting device including an abutting and centering element suitable to be coupled with the hub along the radial slot and arranged in abutment against the edge when the first axis and the second axis are reciprocally aligned.

* * * * *